W. F. SCHALLER.
BAKER'S OVEN.
APPLICATION FILED FEB. 19, 1920.
1,425,342.
Patented Aug. 8, 1922.
6 SHEETS—SHEET 1.
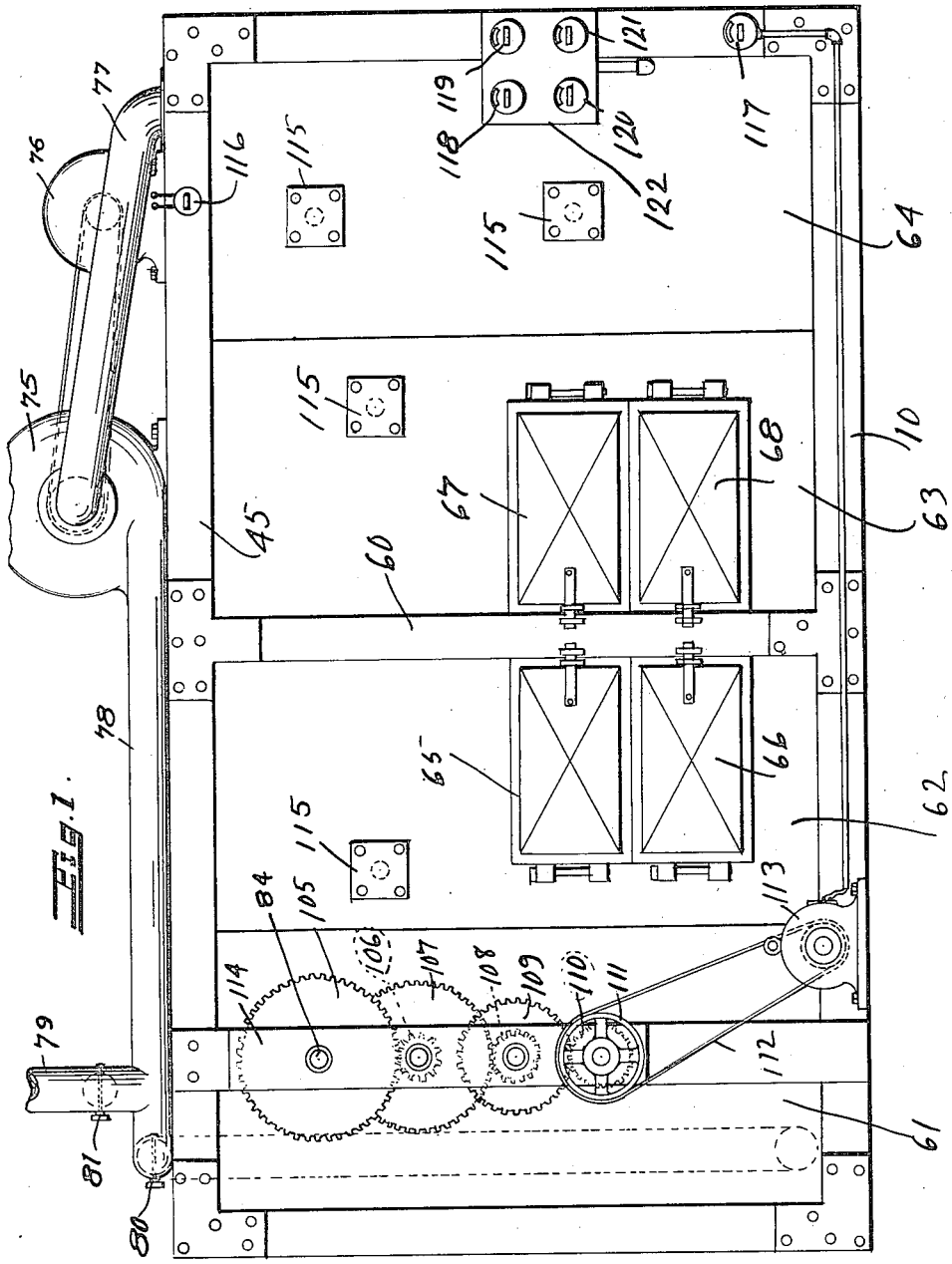
INVENTOR.
W. F. Schaller.
BY
Carlos P. Griffin
ATTORNEY.

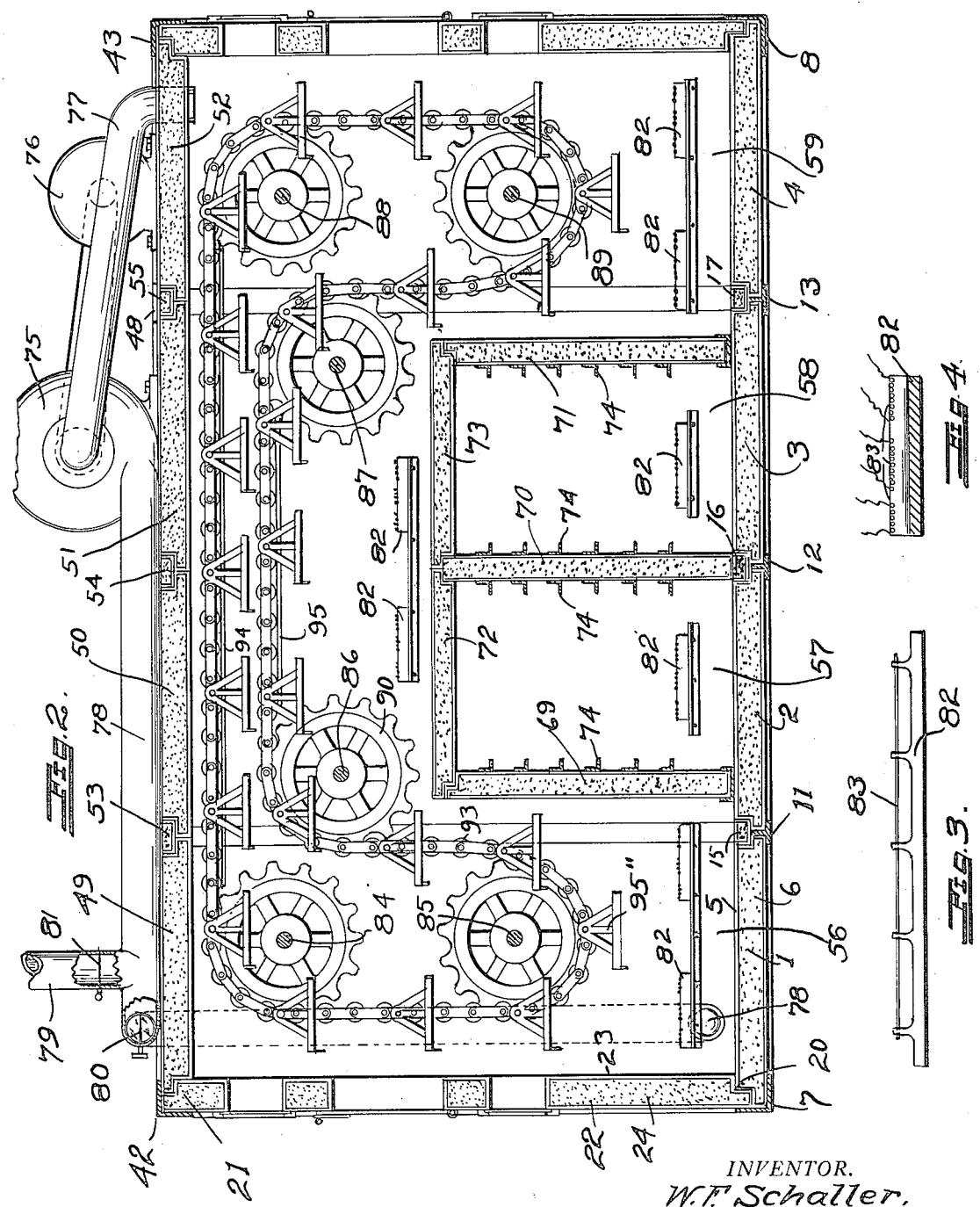

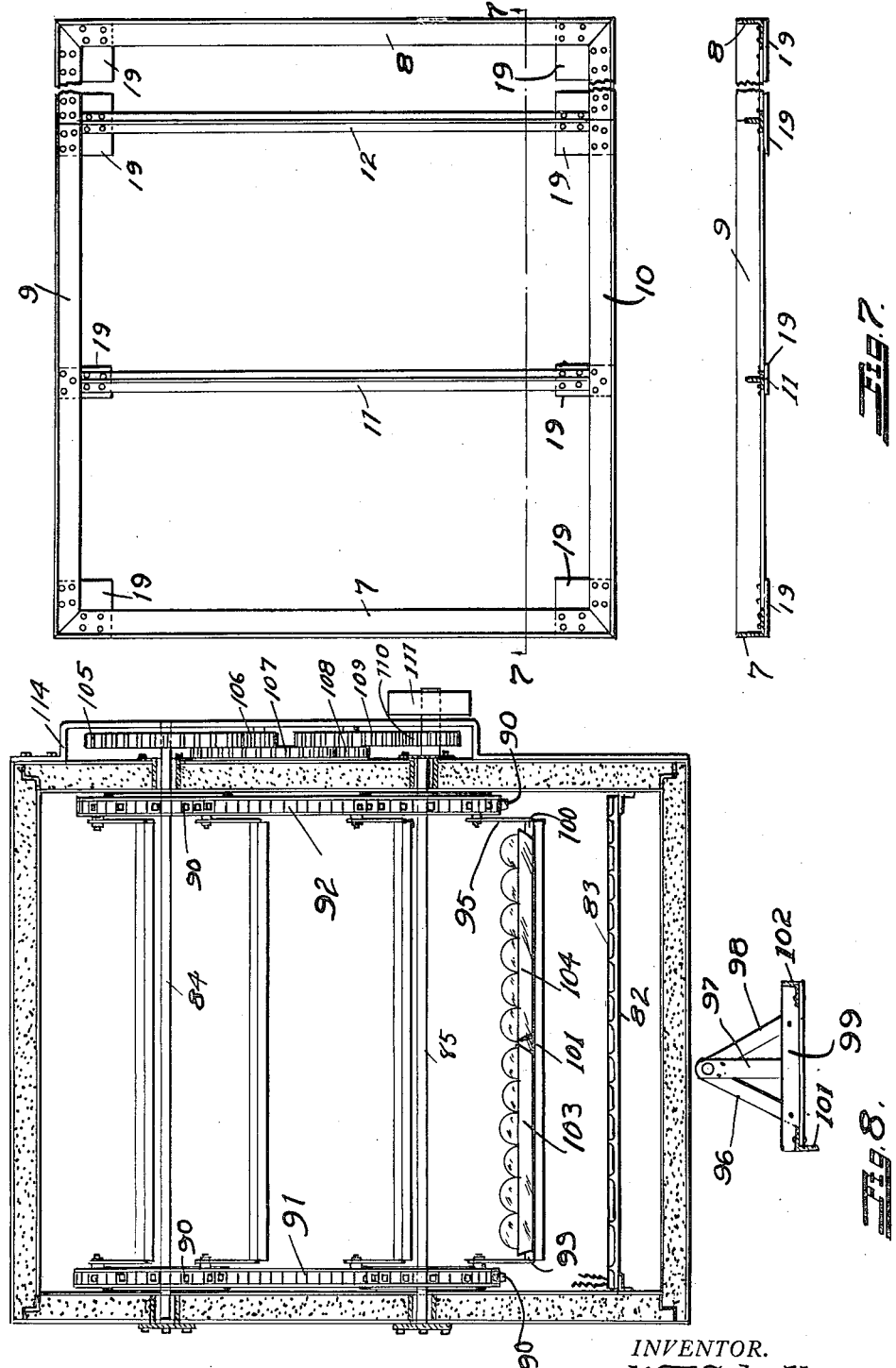

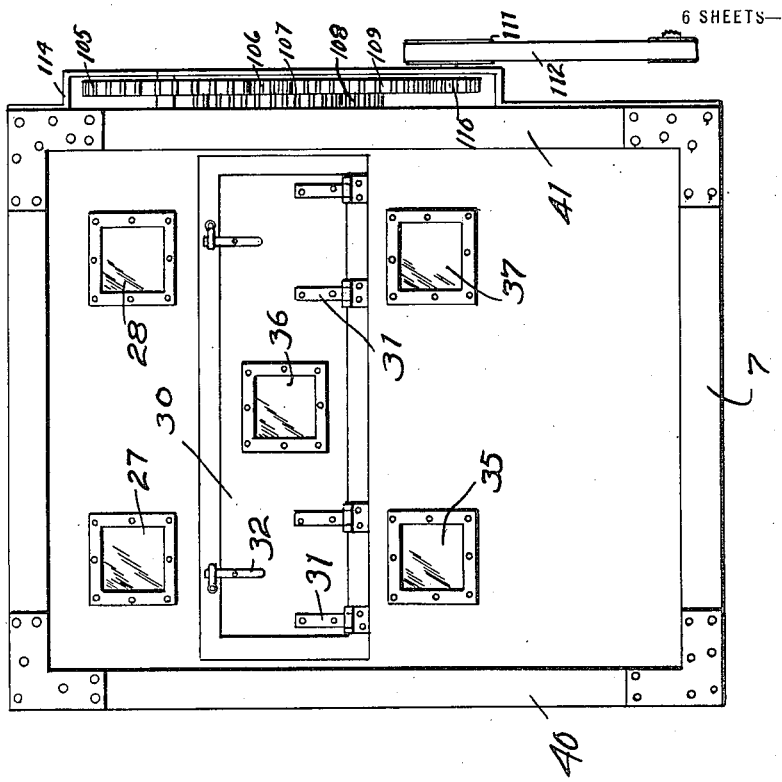
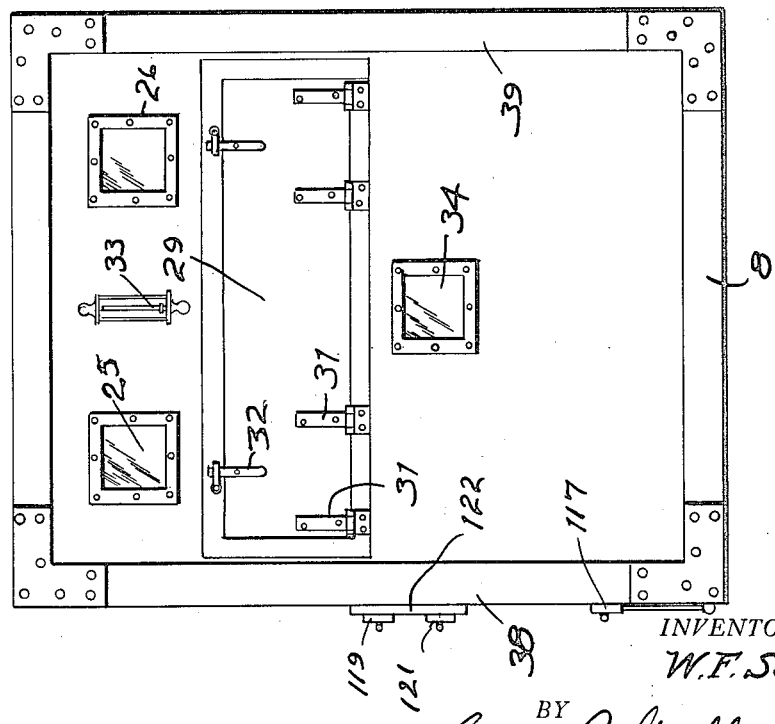

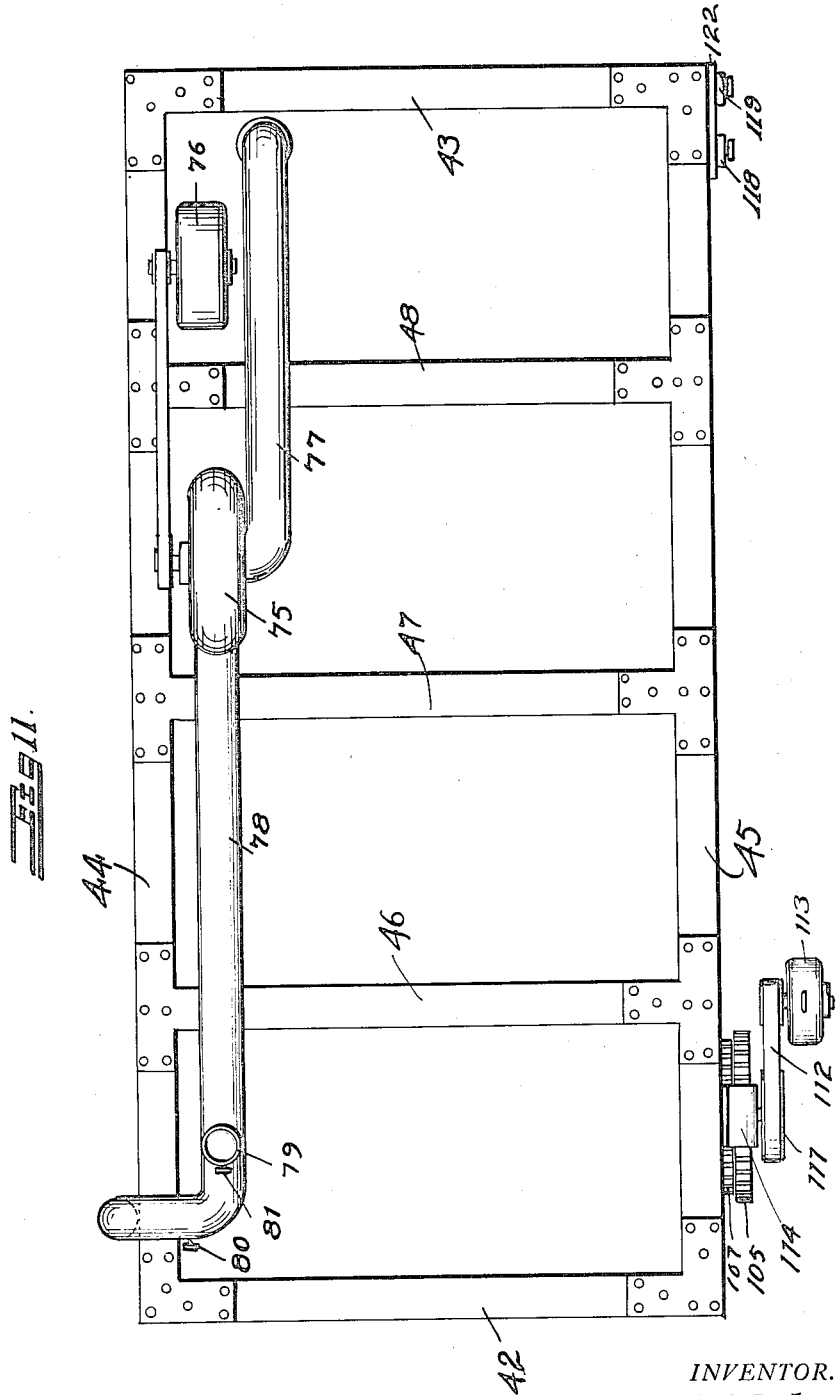

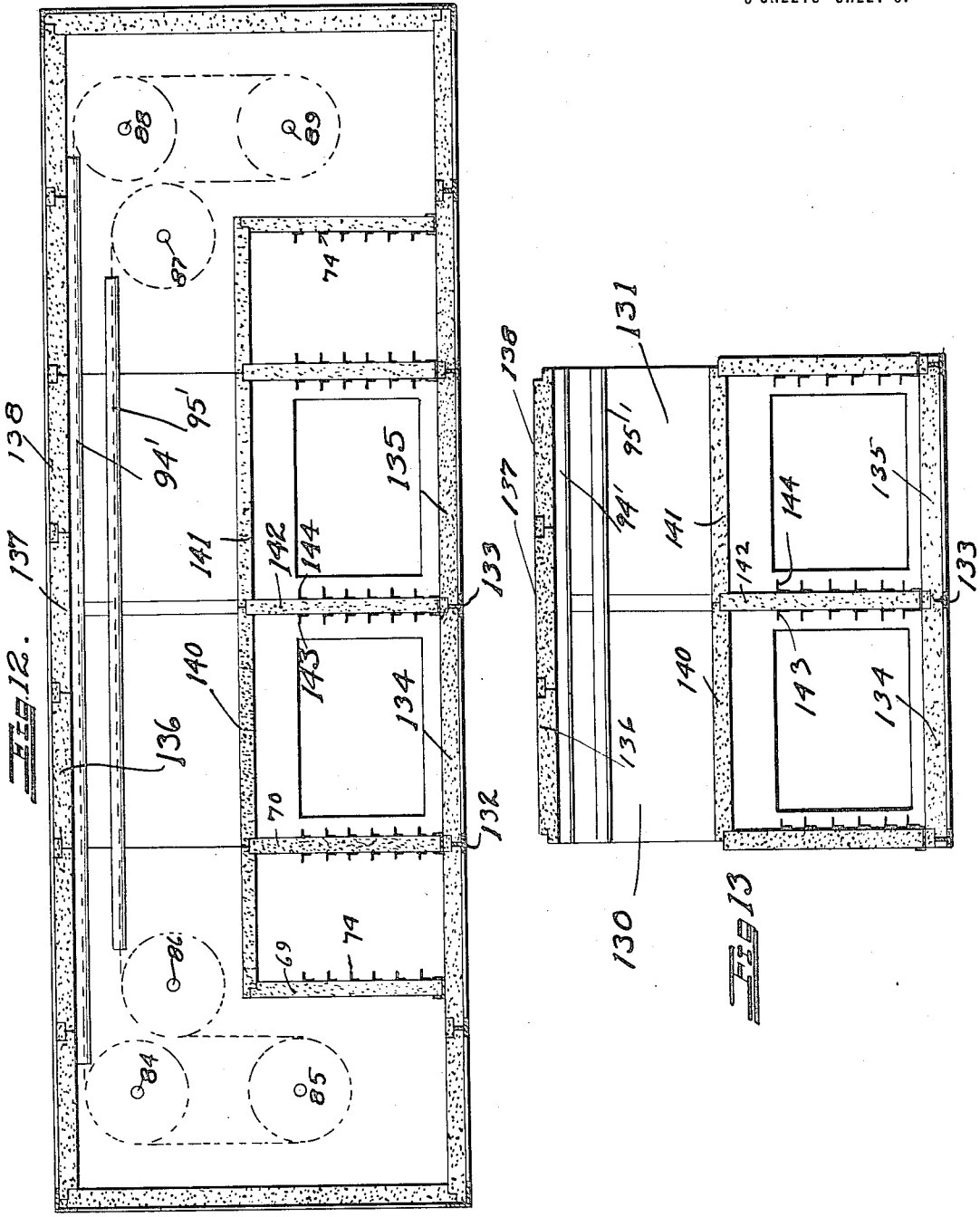

UNITED STATES PATENT OFFICE.

WILLIAM F. SCHALLER, OF SAN FRANCISCO, CALIFORNIA.

BAKER'S OVEN.

1,425,342.  Specification of Letters Patent.  Patented Aug. 8, 1922.

Application filed February 19, 1920. Serial No. 359,767.

*To all whom it may concern:*

Be it known that I, WILLIAM F. SCHALLER, a citizen of the United States, residing at San Francisco, in the county of San Francisco, State of California, have invented a new and useful Baker's Oven, of which the following is a specification, in such full and clear terms as will enable those skilled in the art to construct and use the same.

This invention relates to a baker's oven and the object of the invention is to provide a travelling oven which will shift the bread or cake from place to place in the oven thereby uniformly baking it.

Another object of the invention is to provide means whereby the product being baked may be examined from time to time in order to determine its condition to remove it if that is necessary.

Another object of the invention is to provide an electrically heated oven which will be so constructed as to require the minimum heat to carry out the objects desired.

Another object of the invention is to provide for a mechanical circulation of the air in the oven thereby further equalizing the temperature upon the article being baked.

A further object of the invention is to provide an oven which is capable of being extended as may be required to increase the capacity thereof by the addition thereto of additional center sections the end sections remaining the same in all size ovens.

Another object of the invention is to produce an oven for cake baking in addition to the bread baking oven, the waste space of the bread baking oven being utilized for the production in the same oven of the cake baking oven whereby the loss of heat through the walls of the cake baking oven is reduced to a minimum, since the outside of a portion of the walls of that oven forms a portion of the inside walls of the bread oven.

Another object of the invention is to provide an arrangement of endless carriers such that it is easier to inspect the material being baked because of the fact that a number of trays can be examined at one time and the condition of the material carried thereon readily determined.

Other objects of the invention will appear as the description proceeds.

An embodiment of the invention is shown in the accompanying drawings in which the same reference numeral is applied to the same portion throughout but I am aware that there may be modifications thereof.

Fig. 1 is a side elevation of the complete oven.

Fig. 2 is a longitudinal vertical sectional view of the complete oven.

Fig. 3 is a longitudinal elevation of one of the heating units.

Fig. 4 is a transverse sectional view of one of the heating units.

Fig. 5 is a transverse sectional view of the oven the plane of section being adjacent to driving mechanism.

Fig. 6 is a plan view of a portion of the bottom frame of the oven.

Fig. 7 is a vertical sectional view on the line 7—7 Fig. 6.

Fig. 8 is a transverse vertical sectional view of one of the bread carriers.

Fig. 9 is a view in end elevation of the oven looking from the left Fig. 1.

Fig. 10 is a view in end elevation of the oven looking from the right Fig. 1.

Fig. 11 is a plan view of the complete oven.

Fig. 12 is a longitudinal sectional view of an oven with the carriers omitted showing addition thereto of a center section for increasing the capacity thereof, and Fig. 13 is a vertical sectional view of the added section.

The oven is made up of independent recessed sections 1 to 4 forming the bottom, each of which sections is of the same size as the other.

These sections consist of a metallic covering 5 provided with a filling 6 of a suitable material to prevent undue loss of heat from the oven. The bottom members 1 to 4 inclusive are mounted in a frame consisting of the end angle members 7 and 8 which are in turn connected by a side angle members 9 and 10, which are in turn connected to each other by means of three T bars 11 to 13 inclusive. The upper corners of the bottom slabs are recessed, and where they come together they are filled with a fire clay and asbestos filling, as indicated at 15 to 17 inclusive.

In order to bring the angle bars and T bars into the same plane they are connected by suitable gusset plates 19 where ever a joint is made.

The oven ends are recessed at the edges to fit the bottom and top members as illustrated at 20—21, and they consist of the plates 22—23 suitably connected together and between which there is a filling 24 of a heat insulating material. The two oven ends are provided with windows 25 to 28 inclusive, above the doors 29 and 30, said doors being mounted upon suitable hinges 31, and having suitable latches 32 to hold them shut. The working end of the oven may be provided with a thermometer as indicated at 33, and with one extra window 34 while the store end of the oven may be provided with extra windows 35 to 37 inclusive.

For holding the ends in place, the angle bars 38 to 41 inclusive are connected to the end angle members 7 and 8 and they are in turn connected at their upper ends to the transverse corner angle bars 42—43; the latter bars being in turn connected by longitudinal extending angle bars 44 and 45.

In addition to the foregoing frame, the side angle bars 44—45 are connected together by means of flat strips 46 through 48 over the top of the joining of the top slabs 49 to 52 inclusive. The top slabs are recessed to receive the filling of fire clay and asbestos as indicated at 53 to 55 inclusive, and they are similarly recessed at their ends to fit the recesses of the side members 56 to 59 inclusive.

At the center, the top angle members 10 to 45 inclusive, and 9 to 44 are connected by means of a T bar 60 similar to the T bars 11 to 13 inclusive.

The oven has side slabs 61 to 64 inclusive for its working side. The slabs 62—63 are provided with hinged doors 65 to 68 inclusive, through which access is had to the cake baking compartment formed by the vertical slabs 69 to 71 inclusive, which are covered by the horizontal slabs 72 and 73; the vertical slabs 69 to 71 are provided with a plurality of angle bars 74 to form guide ways for the shelves or pans upon which the cake is baked. In order to provide for circulating the air in the oven and equalizing the heat therein, a fan 75 is mounted on the top of the oven. This fan is driven by motor 76 and has an inlet pipe 77 which extends through slab 52 into the upper portion of the oven, and a discharge pipe 78 from the oven extending to the opposite side of the oven and is connected with the bottom of the slab 56, so that as the fan is operated the air is transferred from the top of one end of the oven to the bottom of the other end thereby equalizing the heat over the entire oven.

In order to regulate the removal of moisture from the oven, the pipe 78 has a branch 79 leading to any suitable place of discharge and the quantity of air discharged from the oven is regulated by means of the two butter-fly valves 80 and 81, there being sufficient air space around the doors 29 and 30 to provide for the continuous loss from the pipe 79, of sufficient air to carry away the moisture escaping from the bread being baked, with the minimum loss of heat from the oven. This is regulated as required.

At the bottom of the oven there are a plurality of porcelain racks 82, said racks carrying suitable resisting wires 83 for heating the oven electrically. Connecting the side slabs of the oven are a plurality of shafts 84 to 89 inclusive, each of which carries a pair of sprocket wheels 90 chains 91—92 pass around the sprocket wheels and said wheels are arranged so that the wheels on the shafts 85 to 89 form two descending and ascending loops where the sheels of the shafts 86—87 and 88—89 form two horizontal extending rungs. The sprocket chains are provided with a plurality of supporting rollers 93 which are supported on their horizontal rungs by the angle plates 94—95, said plates being duplicated at each side of the oven.

The bread is supported upon carriers 95" which are pivotally connected with two chains. Each carrier consists of two end frames having the members 96 to 98 connected to end angle plates 99—100 and said end angle plates are in turn connected to the front of back angle bars 101—102. Angle bars 101 and 102 are wide enough to form suitable shelves for the bread pans 103—104. The chains 91—92 are driven from the sprocket wheels and the shaft 84 and this shaft is in turn driven by the reduction gear trains 105 to 110 inclusive through pulley 111.

Pulley 111 is driven by the belt 112 from the motor 113. The shafts carrying the gears 105 to 110 are mounted upon the plate 114 connected with the side angle bars 10 and 45. The horizontal shafts 84 to 89 inclusive are mounted in suitable bearings 115 which are bolted to the sides of the oven. The motors are controlled by the switches 117—118 while the heating elements within the oven are controlled by the switches 119 to 121 mounted on switch-board 122 at one end of the oven.

In operation, the baker opens the end doors of the oven either end he may desire, and places the pans of bread upon the carriers 95. The motor drives the carriers around the oven about once in five or ten minutes so that the baker can observe the progress of the baking several times during the period required to complete the baking of one lot of bread and may therefore take out the pans whenever it appears to him that the baking has proceeded far enough, although ordinarily the pans are allowed to remain in the oven for a definite period.

When an oven of greater capacity than the one just described is desired, the oven may be extended with the two center sections 130—131, in which event the endless carrier chains are made longer. In each oven the bottom rails are made longer, two additional bottom T rail bars 132—132 to receive two additional bottom slabs 134—135 and similarly to receive the additional top slabs 136 to 138 inclusive. This construction also necessitates the use of longer rails 94' and 95' but otherwise the oven is precisely the same as in the preceding figures.

Since this center expansion provides additional spaces in the lower part of the oven, additional slab members 140—141 resting upon a vertical slab member 142 are used to provide for the support of additional angle bars 143—144 to support additional cake trays so that this oven has four cake baking compartments.

The oven shown in Figures 12 and 13 has its parts substantially identical with the parts shown in the preceeding figures except that the additional section illustrated in Figure 13 is inserted between the oven ends to make the oven longer, thereby providing room for additional bread carriers 95'.

What I claim is as follows, but various modifications may be made in the construction shown in the drawings and above particularly described form, within the purview of my invention.

1. A baker's oven comprising a plurality of slabs joined to form a rectangular enclosure, a plurality of heating elements for heating the enclosure, a fan for circulating air in the oven, a plurality of superposed doors at opposite ends of the oven, a pair of endless chains extending from one end of the enclosure to the other, trays supported by the chains, the chains being arranged to form depending loops at the ends of the oven whereby a plurality of trays may be inspected through the doors at one time means to operate the chains to cause the travel of the material being baked from one end of the oven to the other, a cake oven having walls between the depending loops of the bread carrying chains, doors at the sides of the rectangular enclosure to fill the cake oven, and means to heat the cake oven.

2. A baker's oven comprising a plurality of connected slabs forming a rectangular enclosure, doors at opposite ends of the enclosure, a pair of endless chains in the enclosure, trays supported thereby, means to heat the enclosure, a fan for circulating the heated air from the upper end of one portion of the enclosure to the lower portion of the other end of the enclosure, wheels for supporting said chains to form a pair of depending loops at opposite ends of the oven whereby a plurality of trays may be inspected at one time, a cake oven in the main oven between the depending loops of double prime the bread carrying chains, doors for examining said cake oven, and means to separately heat the cake oven.

In testimony whereof I have hereunto set my hand this 10" day of Feb. A. D. 1920.

WILLIAM F. SCHALLER.